United States Patent [19]
Grygera

[11] 3,825,846
[45] July 23, 1974

[54] SIGNAL ISOLATOR HAVING FEEDBACK CONTROL

[75] Inventor: James W. Grygera, Racine, Wis.

[73] Assignee: Eaton Corporation, Cleveland, Ohio

[22] Filed: Apr. 23, 1973

[21] Appl. No.: 353,280

[52] U.S. Cl. .......................... 330/9, 330/10, 330/28
[51] Int. Cl. .............................................. H03f 3/38
[58] Field of Search ...................... 330/9, 10, 28, 75

[56] References Cited

UNITED STATES PATENTS

| | | | |
|---|---|---|---|
| 2,832,848 | 4/1958 | Neff | 330/10 |
| 3,214,703 | 10/1965 | Offner | 330/10 X |

*Primary Examiner*—Herman Karl Saalbach
*Assistant Examiner*—James B. Mullins
*Attorney, Agent, or Firm*—Teagno & Toddy

[57] ABSTRACT

A control circuit is provided for electrically isolating an input circuit from an output circuit which is responsive to an input signal in the input circuit. A feedback signal indicative of the response of the output circuit is also provided to the input circuit to improve the controllability of the output circuit by the input circuit. This novel control circuit provides the signal indicative of output circuit response from a duplicating circuit which substantially duplicates the response of the output circuit to the input circuit signal. The output from the duplicating circuit is connected by a feedback loop to the input circuit to establish a control signal in the input circuit. This control signal assures an accurate response of the output circuit and the duplicating circuit to the input signal in the input circuit. The duplicating circuit is electrically isolated from the output circuit to maintain the electrical isolation between the input and output circuits.

4 Claims, 1 Drawing Figure

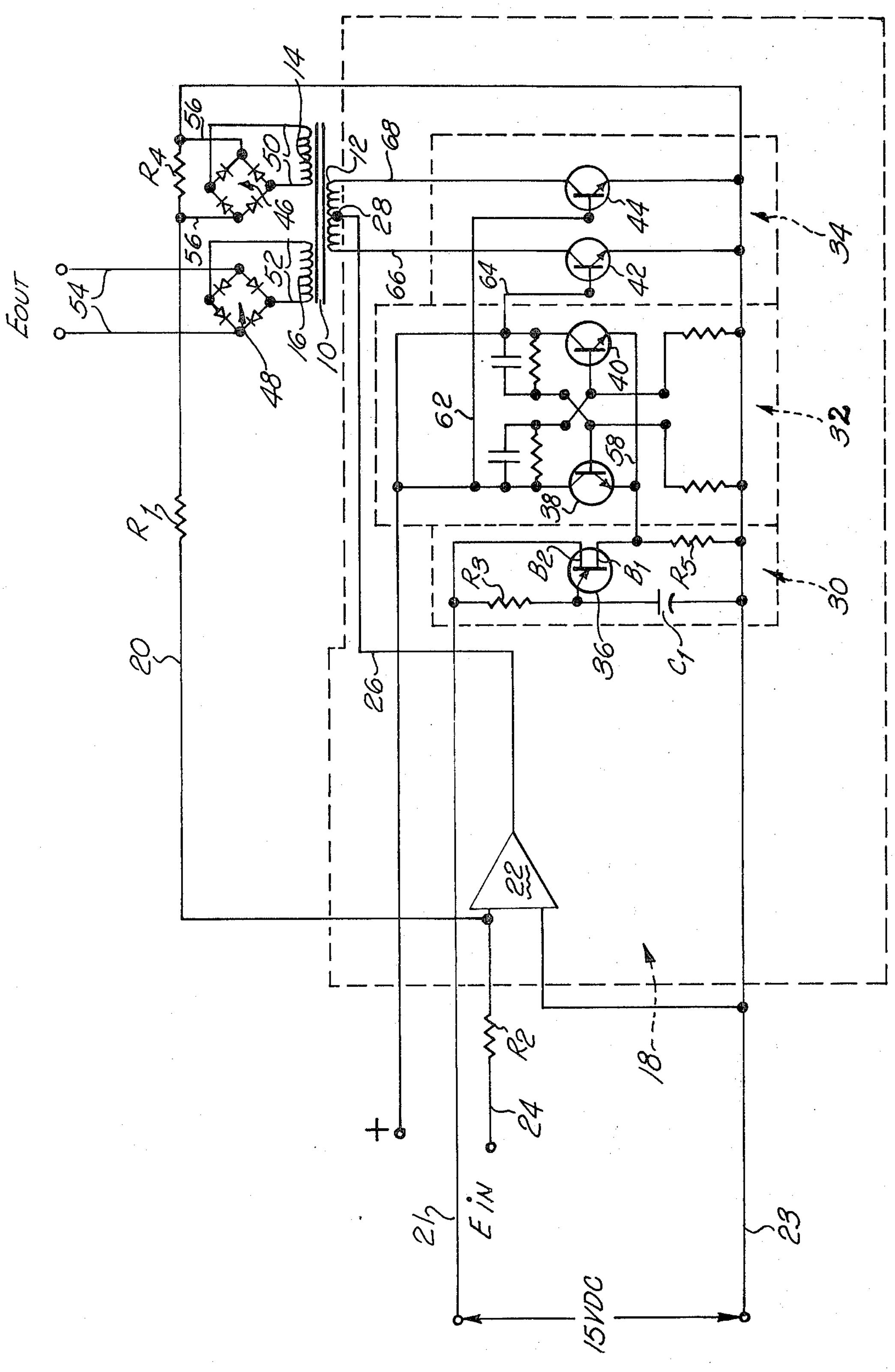
EOUT
EIN
15VDC

SIGNAL ISOLATOR HAVING FEEDBACK CONTROL

BACKGROUND OF THE INVENTION

1. Field of the Invention

The present invention relates to control circuits generally and more particularly to a control circuit wherein an output circuit is controlled by an input circuit which includes a feedback signal indicative of the output of the output circuit and wherein the output circuit is electrically isolated from the input circuit.

2. Background of the Invention

Numerous known control applications require the electrical isolation of an output circuit from an input circuit which controls it. Once the input and output circuits are electrically isolated from each other some benefits in the signal response of the circuits may be achieved. For example, the circuits may now be separately grounded and any noise that one circuit may be subject to will not be transmitted to the other circuit. The output circuit will respond only to the input circuit signal. Good controllability of the responding signal in the output circuit is also very desirable and this is usually accomplished by directing a feedback signal from the output circuit to the input circuit to thereby allow continuous monitoring of the response of the output circuit with comparison of the feedback signal to some reference signal to assure good control. Since this type of feedback control requires an electrical connection between the input and output circuits, maintaining electrical isolation between the circuits becomes impossible in prior known devices which utilize feedback controls.

Known prior art devices used to effect electrical isolation between a controlling circuit and a controlled circuit include photocouplings as well as transformer couplings.

Photocoupling devices utilize a light emitting device such as a light emitting diode and a light sensitive device such as a phototube. The light emitting diode is electrically connected to one circuit and emits light of an intensity dependent upon a signal in the first circuit. The light sensitive device is electrically connected to another circuit which is electrically isolated from the first circuit. The two circuits are located so that the phototube senses the intensity of the light emitting diode and thereby produces a signal which is also responsive to the signal in the first circuit. As such the above control circuit is an open-loop control system. Providing a feedback control signal from the second to the first circuit would make the control a closed-loop system with good controllability but the feedback signal connection would also destroy the electrical isolating ability of the photocoupling device.

Transformer couplings utilize an iron core on which a pair of windings are mounted. One winding is connected to a controlling circuit while the other winding is connected to a controlled circuit. A time-varying signal applied to the first winding will induce a time-varying signal in the second winding in relation to the turns ratio between the first and second windings while maintaining electrical isolation between the windings. To connect the first and second windings by a feedback control signal loop would also destroy the electrical isolating ability of the transformer coupling by producing an electrical connection between the loops and consequently between the controlling and the controlled circuit.

Transformer couplings transform the voltage on their first winding to the second winding in direct proportion to the turns ratio of the respective windings while transforming the current in proportion to the inverse turns ratio of the respective windings. Thus, if a low level voltage is to be transformed to a high level voltage by the transformer, a high turns ratio is required between the windings. This high turns ratio will by necessity decrease the transformed current. As an example, if the transformed voltage is to be doubled, the transformed current will be halved. Thus, the known transformer couplings have also been impractical as low level input signal amplifiers for controlling output signals in isolated output circuits that require significant current draw at amplified voltages.

SUMMARY OF THE INVENTION

The Applicant's invention solves the above-named problems of the prior art devices and others by providing a unique control circuit which includes a feedback signal for controlling the output of an output circuit which is responsive to and electrically isolated from an input circuit.

Electrical isolation between circuits is produced by having input signal means establish a control signal in the input circuit capable of controlling the output circuit. The control signal, in turn, establishes an output signal in the output circuit through a coupling means which provides electrical isolation of the output circuit from the output circuit while allowing the output circuit to be fully responsive to a signal in the input circuit.

The above described electrically isolated input and output circuits are further coupled to a feedback control signal connected to the input circuit which maintains the integrity of the electrical isolation. This is done by providing the feedback signal from a duplicating means which establishes a signal which is directed to the input circuit and which is indicative of the output signal in the output circuit. The signal from the duplicating means is directed through a feedback loop to the input circuit to allow for improved control of the electrically isolated output circuit by the input circuit. The duplicating means is maintained electrically isolated from the output circuit to preclude any electrical connection between the input and output circuits while allowing substantially duplicate signals to be induced by the input circuit in both the output circuit and the duplicating circuit.

A more particular embodiment of the Applicant's present invention involves the utilization of a transformer having three electrically isolated windings. The first transformer winding is electrically connected to the input circuit. The second and third transformer windings are substantially identical in that a signal in the first winding induces a substantially identical output signal in the second and third windings. The second winding is electrically connected to the output circuit while the third winding is coupled to the input circuit and provides a feedback signal to control the signal established in the first winding and ultimately the output signal established by the output circuit.

From the foregoing it should be apparent that the Applicant's invention provides a feedback signal to an input circuit which is indicative of the output signal in an output circuit while maintaining electrical isolation between the input and output circuits. This allows the input and output circuits to be individually grounded and prevents any noise transmission between the input and output circuits. At the same time, feedback control assures that the stability and accuracy of the output signal will be increased.

Accordingly, an object of the present invention is to provide a control circuit for controlling an output circuit which is electrically isolated from an input circuit and wherein feedback is provided to the input circuit for controlling the output circuit without destroying the electrical isolation of the output circuit relative to the input circuit.

Another object of the present invention is to provide a control circuit as set forth in the preceding paragraph wherein a duplicating circuit is provided which is electrically isolated from the output circuit and which establishes a feedback signal indicative of the output of the output circuit.

A further object of the present invention is to provide a control circuit as recited in the preceding paragraph further including an operational amplifier in the input circuit for amplifying the input signal of the input circuit to a level capable of controlling the output circuit prior to coupling it to the electrically isolated output circuit.

These and other objects of the present invention will become obvious upon consideration of the Applicant's drawing and description of the preferred embodiment which follow.

BRIEF DESCRIPTION OF THE DRAWINGS

The single FIGURE is a schematic representation of an electrically isolated output circuit controlled by an input circuit utilizing a feedback signal.

DESCRIPTION OF THE PREFERRED EMBODIMENT

Referring now to the drawing it will be understood that the showings therein are intended for purposes of illustrating the preferred embodiment of the invention and not for the purposes of limiting same.

Briefly, the described preferred embodiment allows an input signal to control an output signal in an output circuit which is maintained electrically isolated from the input circuit even with a feedback control signal being connected to the input circuit which control signal is indicative of the output of the output circuit.

To accomplish the above described control, the input signal $E_{in}$ is directed through an operational amplifier 22 which raises the level of the signal $E_{in}$ and directs it to a primary winding 12 of a transformer 10. The transformer 10 has a pair of substantially identical secondary windings 14 and 16 which are electrically isolated from each other. The control signal from the amplifier 22 is applied along line 26 to the primary winding 12 to electromagnetically induce substantially identical signals in both secondary windings 14 and 16. The signal in secondary winding 16 is directed through a full wave rectifying bridge 48 to establish output signal $E_{out}$ which is directed to an output circuit (not illustrated).

The signal on the secondary winding 14 is electrically connected through a feedback circuit to an input circuit 18 via line 20. The signal on the secondary winding 14 is identical to the output signal on the secondary winding 16. This allows the input circuit 18, by monitoring the output of secondary winding 14, to indirectly sense the output from the secondary winding 16 while maintaining it electrically isolated from itself.

The input circuit 18 includes the high gain operational amplifier 22 which operates as a differential amplifier. The operational amplifier 22 compares the input signal $E_{in}$, communicated along line 24, and the feedback signal from the secondary winding 14, communicated along line 20, to establish the amplified control signal in the first winding 12. Typically, the input signal $E_{in}$ is a 1 volt DC signal and the gain of the operational amplifier, as determined by the ratio of resistors $R_1$ and $R_2$, is approximately 20. At saturation, the output of the operational amplifier is approximately 15 volts DC. Typically the output of the operational amplifier 22 is 10 volts DC, which output signal is communicated by the operational amplifier 22 to the primary winding 12 along line 26. The typically 10 volt DC output signal from the operational amplifier 22 is applied via line 26 to a center-tap 28 of the winding 12 and is alternately conducted along one half and then the other half of the winding 12 to establish a typically 20 volt peak to peak AC signal in the primary winding 12. The 10 volt DC signal from the operational amplifier 22 is alternately conducted along the different halves of the primary winding due to the action of an oscillator 30, a multivibrator 32 and a chopper 34 which are more fully defined below.

The oscillator 30 establishes a cyclic signal which provides a set and a reset signal to the bistable multivibrator 32 which acts as a flip-flop circuit. The output of the multivibrator 32 is directed to the chopper 34 which responds to alternately connect the opposite ends of the primary winding 12 to ground thereby establishing the AC signal in the primary winding 12.

The oscillator 30 includes a unijunction transistor 36 which is actuated into conduction by a 15 volt potential established across lines 21 and 23 and acting through the RC circuit comprised of $R_3$ and $C_1$. When the capacitor $C_1$ is charged by the 15 volt source through resistor $R_3$ to the triggering level of approximately 9 volts, conduction between bases $B_1$ and $B_2$ of the unijunction transistor 36 is initiated and the capacitor $C_1$ is discharged through the base $B_1$ and $R_5$. When the capacitor $C_1$ discharges, the unijunction transistor 36 becomes nonconductive and the capacitor $C_1$ is again charged via the resistor $R_3$ until it again reaches the triggering level of unijunction transistor 36.

The conductive and nonconductive states of the unijunction transistor 36 provide set and reset signals to transistors 38 and 40 by way of line 58 and resistor $R_5$ as is well known to those skilled in the art. The transistors 38 and 40 form a flip-flop circuit which functions to have the transistor 38 conductive when the transistor 40 is nonconductive and vice versa, as is also well known to those skilled in the art. This alternate conduction of the flip-flop circuit provides alternate signals along lines 62 and 64 from the bistable multivibrator 32 to the chopper 34 to actuate the transistors 42 and 44 of the chopper circuit 34. The transistors 42 and 44 are made conductive by the signals from transistors 40 and 38 conducted along lines 64 and 62, respectively. Since the transistors 38 and 40 are alternately conductive, transistors 44 and 42 are similarly made alternately conductive through alternate signals applied to lines 62 and 64. In this way a bi-directional discharge path for the output of the operational amplifier 22 is provided along lines 66 and 68 depending upon whether transistor 42 or 44 is conductive.

Discharging the DC output of the operational amplifier 22 alternately through the transistors 42 and 44 produces an AC signal in the winding 12 which will electromagnetically induce AC signals in the secondary windings 14 and 16 of the transformer 10. The signal level in the windings 14 and 16 is dependent upon the turns ratio of the primary winding 12 and the secondary windings 14 and 16.

The secondary windings 14 and 16 have the identical number of turns to assure that substantially identical signals will be induced in both of the secondary windings 14 and 16 by any signal in the primary winding 12. The turns ratio between the primary winding 12 and the secondary windings 14 and 16 is made such that if a signal of 20 VAC is established in the primary winding 12 a signal of 20 VAC will be induced in each of the secondary windings 14 and 16. The induced voltages in secondary windings 14 and 16 are conducted along respective lines 50 and 52 to respective full-wave bridge rectifiers 46 and 48. The rectifiers 46 and 48 convert the induced AC voltage signals to DC signals. The DC output of the secondary winding 16 is conducted along lines 54 to establish the output signal $E_{out}$ which is directed to the output circuit (not shown). The output circuit is maintained electrically isolated from the input circuit 18 by the action of the transformer 10.

The output signal of the full-wave bridge rectifier 46 is connected by line 20 to the operational amplifier 22 to provide a feedback signal to the input circuit 18. Since the output signal from the rectifier bridge 46 is identical to the output signal from the rectifier bridge 48, the feedback signal provides a signal indicative of the output $E_{out}$ which is maintained in the output circuit while allowing the output circuit to be electrically isolated from the input circuit 18 through the isolating action of the transformer 10.

To insure that the output signals from the full-wave rectifier bridge 46 and the full-wave rectifier bridge 48 are maintained substantially identical, a resistor $R_4$ is connected across the output lines 56 of the rectifier bridge 46. The resistor $R_4$ is substantially identical to the resistance of the output circuit (not shown) which is connected across lines 54. This assures that both the output signal $E_{out}$ and the feedback signal react in a substantially similar manner.

To compensate for any ambient temperature effects that the winding 16 and the full-wave rectifier bridge 48 may experience from the surrounding atmosphere, the winding 14 and the rectifier bridge 46 are mounted in close proximity to the winding 16 and the rectifier bridge 48. This insures that both the windings 14 and 16 and rectifier bridges 46 and 48 are subjected to the same ambient temperature and will, therefore, react in the same manner. Thus, any temperature effect produced in the isolated output $E_{out}$ will also be produced in the feedback signal output across $R_4$.

The amplifier 22 acts to raise the signal level of the input signal $E_{in}$ to a control level capable of controlling the output circuit prior to applying it to the primary winding 12 of the transformer 10. This amplified input signal is then electromagnetically coupled to the secondary windings 14 and 16. Since the amplification of the input signal is done prior to transformer coupling it to the output circuit there is no amplification required by the transformer 10 and a transformer turns ratio approaching unity is utilized. This does not cut down on the current supplied to the output circuit and low level input signal $E_{in}$ may, therefore, be used to control a high current draw output circuit.

It is thus seen that a novel control system has been disclosed whereby a low level input signal $E_{in}$ controls a high current output signal $E_{out}$. The output circuit is maintained electrically isolated from the input circuit even though a feedback control is utilized. The feedback control uses a feedback signal from a circuit which duplicates the output signal of the output circuit while maintaining the duplicating circuit electrically isolated from the output circuit. Thus, the benefits of electrically isolated input and output circuits are combined with the controllability features of a feedback control.

It will be understood that certain modifications and improvements may be made to the above preferred embodiment by those skilled in the art. As an example of one such modification it will be understood that a photoelectric coupling could be substituted for the electromagnetic coupling. This could be accomplished by having two photosensors react to a light source in the input circuit with a feedback signal provided from one of the photosensors and an output signal provided by the other photosensor.

What I claim as new and desire to secure by Letters Patent of the United States is:

1. A control circuit for controlling the output of an output circuit which is responsive to and electrically isolated from an input circuit providing an input signal comprising:

a transformer having a center-tapped primary winding and a pair of secondary windings;

an input signal amplifier having an input connected to the input signal and an output connected to said center-tapped primary winding to provide an amplified input signal to said primary winding;

a chopper circuit connected across said primary winding to alternately conduct the amplified input signal between the center-tap and the ends of said primary winding to induce an output in said pair of secondary windings;

one of said pair of secondary windings being electrically connected to said input of said input signal amplifier to provide a feedback signal to said amplifier indicative of the output in said second of said pair of secondary windings; and said second of said pair of secondary windings being electrically isolated from said primary winding and said first of said pair of secondary windings to provide an electrically isolated output signal.

2. A control circuit as set forth in claim 1 including a first rectifier bridge connected across said first of said secondary windings and a second rectifier bridge connected across said second of said secondary windings to provide a rectified output signal from said first and second secondary windings.

3. A control circuit as set forth in claim 2 including a load matching resistor connected across the output of said first rectifying bridge substantially equivalent to the resistance of an output circuit connected across the output of said second rectifying bridge, said load matching resistor being series connected to said input of said input signal amplifier to establish a rectified signal to said amplifier indicative of the rectified output to said output circuit.

4. A control circuit as set forth in claim 1 wherein said chopper circuit includes a first transistor connected to one end of said primary winding and a second transistor connected to the other end of said primary winding, said first and second transistors being connected to a multivibrator circuit for alternately firing said first and second transistors to alternately conduct said amplified input signal through said first and second transistors.

* * * * *